United States Patent
Kobayashi et al.

(10) Patent No.: US 7,876,548 B2
(45) Date of Patent: Jan. 25, 2011

(54) NIOBIUM SOLID ELECTROLYTIC CAPACITOR AND ITS PRODUCTION METHOD

(75) Inventors: Yasumi Kobayashi, Yawata (JP); Takashi Umemoto, Hirakata (JP); Hiroshi Nonoue, Hirakata (JP)

(73) Assignee: Sanyo Electric Co., Ltd., Morighchi (JP)

( * ) Notice: Subject to any disclaimer, the term of this patent is extended or adjusted under 35 U.S.C. 154(b) by 326 days.

(21) Appl. No.: 12/098,578

(22) Filed: Apr. 7, 2008

(65) Prior Publication Data

US 2008/0259527 A1 Oct. 23, 2008

(30) Foreign Application Priority Data

Apr. 20, 2007 (JP) ............................ 2007-111726
Mar. 12, 2008 (JP) ............................ 2008-062027

(51) Int. Cl. *H01G 9/00* (2006.01)
(52) U.S. Cl. .................. 361/523; 361/525; 361/528; 361/529; 361/540; 361/541; 29/25.01; 29/25.03
(58) Field of Classification Search ........... 361/529, 361/523–528, 530, 540–541, 516–519; 29/25.01, 29/25.03
See application file for complete search history.

(56) References Cited

U.S. PATENT DOCUMENTS

| 6,215,652 | B1 * | 4/2001 | Yoshida et al. | 361/524 |
| 6,322,912 | B1 * | 11/2001 | Fife | 428/702 |
| 6,558,447 | B1 * | 5/2003 | Shekhter et al. | 75/252 |
| 6,855,177 | B2 * | 2/2005 | Fujii et al. | 29/25.03 |
| 7,038,902 | B2 * | 5/2006 | Takatani et al. | 361/524 |
| 7,349,198 | B2 * | 3/2008 | Yano et al. | 361/524 |
| 7,460,357 | B2 * | 12/2008 | Takeda et al. | 361/523 |

FOREIGN PATENT DOCUMENTS

| JP | 11-329902 A1 | 11/1999 |
| JP | 2002-231583 A1 | 8/2002 |
| JP | 2005-252224 A1 | 9/2005 |
| WO | 2004/068517 A1 | 8/2004 |

* cited by examiner

*Primary Examiner*—Nguyen T Ha
(74) *Attorney, Agent, or Firm*—Marvin A. Motsenbocker; Mots Law, PLLC

(57) ABSTRACT

Disclosed are a niobium solid electrolytic capacitor capable of reducing leak current that may occur in high heat treatment in a reflow process and capable of preserving the capacity before and after heat treatment, and a method for producing it. The niobium solid electrolytic capacitor comprises an anode containing an oxide of niobium monoxide or niobium dioxide and a metal of niobium or a niobium alloy, a dielectric layer formed on the surface of the anode, and a cathode formed on the dielectric layer, wherein the dielectric layer contains fluorine.

11 Claims, 2 Drawing Sheets

NIOBIUM SOLID ELECTROLYTIC CAPACITOR AND ITS PRODUCTION METHOD

BACKGROUND OF THE INVENTION

1. Field of the Invention

The present invention relates to a niobium solid electrolytic capacitor and its production method.

2. Description of the Related Art

Niobium has a dielectric constant about 1.8 times larger than that of tantalum which is a material of conventional solid electrolytic capacitors, and is therefore specifically noted as a material of next-generation high-capacity solid electrolytic capacitors.

However, when a solid electrolytic capacitor is mounted on the surface of a substrate, it may be exposed to high heat in are flow process. In a niobium solid electrolytic capacitor, a part of oxygen in the dielectric layer of niobium oxide may diffuse into the anode, whereby the thickness of the dielectric layer may reduce and some defects may form in the dielectric layer. As a result, the dielectric layer may give leak current and the layer may peel from the cathode owing to the defects, thereby causing a problem in that the capacitance may reduce.

For preventing the characteristic deterioration in the reflow process of mounting a solid electrolytic capacitor, investigated is a method of adding niobium oxide to a sintered anode body (JP-A 2002-231583, and WO2004/068517).

For the purpose of reducing leak current, proposed is a method that comprises processing an anode of niobium or a niobium alloy for anodic oxidation in an aqueous solution containing a fluoride ion followed by further anodic oxidation in an aqueous solution containing a phosphate ion or a sulfate ion (JP-A 2005-252224).

Also proposed is nitridation of anode for reducing the capacitance change before and after the reflow process in part-mounting a niobium solid electrolytic capacitor (JP-A 11-329902).

SUMMARY OF THE INVENTION

An object of the invention is to provide a niobium solid electrolytic capacitor capable of reducing leak current that may occur in high heat treatment in a reflow process or the like and capable of preserving the capacity before and after heat treatment, and to provide a method for producing it.

The niobium solid electrolytic capacitor of the invention comprises an anode containing an oxide of niobium monoxide or niobium dioxide and a metal of niobium or a niobium alloy, a dielectric layer formed on the surface of the anode, and a cathode formed on the dielectric layer, and is characterized in that the dielectric layer contains fluorine.

In the invention, the dielectric layer contains fluorine, therefore preventing the formation of defects inside the dielectric layer and preventing a part of oxygen in the dielectric layer from diffusing toward the side of the anode during heat treatment in a reflow process or the like. In the invention, the anode is formed of an oxide of niobium monoxide or niobium dioxide and a metal of niobium or a niobium alloy. Oxygen in niobium monoxide or niobium dioxide is supplied to the defects in the oxide film, dielectric layer, and the defects are thereby repaired by the oxygen. Therefore, according to the invention, the dielectric layer may prevent the formation of defects therein, and the defects, if formed, may be repaired by the oxygen in niobium monoxide or niobium dioxide. Therefore according to the invention, leak current may be remarkably reduced and the capacity retentiveness before heat treatment and after heat treatment in a reflow process or the like may be increased.

In the invention, it is desirable that the peak of the fluorine concentration distribution in the dielectric layer exists in the interface adjacent to the anode or in less than a half in the thickness direction of the dielectric layer on the anode side. The fluorine concentration distribution profile as above may contribute toward further reduction in leak current, therefore increasing the capacity retentiveness.

In the invention, it is desirable that the dielectric layer additionally contains phosphorus. Containing phosphorus therein, the dielectric layer may prevent formation of defects in the surface thereof, therefore more effective for reducing leak current and increasing the capacity retentiveness.

Preferably in the dielectric layer, phosphorus is shifted on the cathode side. "Shifting" in the invention means that the peak of the phosphorus concentration distribution exists in the interface adjacent to the cathode or in less than a half in the thickness direction of the dielectric layer on the cathode side. In particular, it is desirable that at least 90% of phosphorus in the dielectric layer exists in a region of $1/10$ of the thickness of the dielectric layer on the cathode side.

In the invention, it is desirable that the dielectric layer further additionally contains nitrogen. Further additionally containing nitrogen therein, the dielectric layer may more effectively prevent formation of defects in the surface thereof, therefore even more effective for reducing leak current.

In the invention, the content of niobium monoxide or niobium dioxide in the niobium or niobium alloy that constitutes the anode is preferably within a range of from 5 to 50% by weight of the overall mount of the anode, more preferably from 15 to 45% by weight, even more preferably from 25 to 35% by weight. Satisfying the defined range, the embodiment is more effective for reducing leak current and increasing the capacity retentiveness.

In the invention, the fluorine content is preferably within a range of from 0.002 to 1% by weight of the total of the anode and the dielectric layer, more preferably from 0.01 to 0.7% by weight, even more preferably from 0.02 to 0.5% by weight. Satisfying the defined range, the embodiment is more effective for reducing leak current and increasing the capacity retentiveness.

In the invention where the dielectric layer contains phosphorus, the phosphorus content is preferably within a range of from 0.0003 to 0.15% by weight, more preferably from 0.0015 to 0.1% by weight, even more preferably from 0.003 to 0.06% by weight. Satisfying the defined range, the embodiment is more effective for reducing leak current and increasing the capacity retentiveness.

In the invention where the dielectric layer contains nitrogen, the nitrogen content is preferably within a range of from 0.01 to 3% by weight of the total of the anode and the dielectric layer, more preferably from 0.05 to 3% by weight, even more preferably from 0.1 to 2% by weight. Satisfying the defined range, the embodiment is more effective for reducing leak current.

In the niobium solid electrolytic capacitor of the invention, preferably used is a niobium powder or alloy powder having a product of the capacity and the electrolytic voltage, CV of at least 100,000 per gram [μF·V/g]. Satisfying the CV value that falls within the defined range, the embodiment is more effective for reducing leak current and increasing the capacity retentiveness. Not specifically defined, the uppermost limit of the CV value may be generally at most 500,000 [μF·V/g].

The production method of the invention is a method for producing the above-mentioned niobium solid electrolytic capacitor of the invention, and comprises a step of anodic oxidation of an anode containing an oxide of niobium monoxide or niobium dioxide and a metal of niobium or a niobium alloy, in an aqueous solution containing a fluoride ion.

According to the production method of the invention, a niobium solid electrolytic capacitor capable of reducing leak current and capable of increasing the leak current before and after heat treatment in a reflow process or the like, can be efficiently produced in a simple process.

In the invention, the anode containing an oxide of niobium monoxide or niobium dioxide and a metal of niobium or a niobium alloy may be prepared by mixing niobium monoxide particles or niobium dioxide particles in niobium particles or niobium alloy particles followed by sintering the mixture. In the invention, niobium monoxide particles and niobium dioxide particles may be used either singly or as combined. In case where they are combined and used, it is desirable that the total amount of the niobium monoxide particles and the niobium dioxide particles could be within a range of from 5 to 50% by weight of the overall amount of the anode, as so mentioned in the above.

Niobium particles and niobium alloy particles may be used either singly or as combined.

Fluorine may be introduced into the dielectric layer through anodic oxidation of the layer in an aqueous solution containing a fluoride ion, as so mentioned in the above.

In case where the dielectric layer additionally contains phosphorus, the above-mentioned anodic oxidation may be followed by additional anodic oxidation in an aqueous phosphoric acid solution, whereby phosphorus may be introduced into the dielectric layer.

In the invention, the aqueous solution containing a fluoride ion may be an aqueous solution containing any of ammonium fluoride, potassium fluoride, sodium fluoride, hydrofluoric acid, etc.

Not specifically defined, the fluoride ion concentration of the fluoride ion-containing aqueous solution is preferably from 0.001 to 0.010% by weight, more preferably from 0.003 to 0.007% by weight. The temperature of the fluoride ion-containing aqueous solution in anodic oxidation is preferably within a range of from 10 to 80° C., more preferably from 20 to 50° C.

Not specifically defined, the concentration of the aqueous phosphoric acid solution is preferably within a range of from 0.2 to 5% by weight, more preferably from 0.5 to 2% by weight. The temperature in the additional anodic oxidation is preferably within a range of from 40 to 90° C., more preferably from 60 to 70° C.

In the invention, for introducing nitrogen into the dielectric layer, employable is a method comprising nitriding oxide particles of niobium monoxide or niobium dioxide and metal particles of niobium or a niobium alloy, and then sintering it to form a nitrogen-containing anode, or comprising sintering oxide particles of niobium monoxide or niobium dioxide and metal particles of niobium or a niobium alloy, and then nitriding it to form a nitrogen-containing anode, thereby introducing nitrogen into the dielectric layer.

The nitridation temperature is preferably within a range of from 200 to 1000° C., more preferably from 250 to 800° C., even more preferably from 300 to 600° C. The nitridation time is preferably within a range of from 1 minute to 1 hour, more preferably from 10 minutes to 40 minutes, even more preferably from 15 minutes to 30 minutes.

The nitrogen content of the atmosphere in the nitridation is preferably from 80 to 100%, more preferably from 90 to 100%, even more preferably from 95 to 100%.

The niobium alloy to form the anode is, for example, a niobium-based alloy that contains at least one element of tungsten, vanadium, zinc, aluminium, molybdenum, hafnium and zirconium.

In the invention, a conductive polymer layer is formed on the dielectric layer, and a cathode of a carbon layer and a silver paste layer is formed thereon, like in ordinary niobium solid electrolytic capacitors.

According to the invention, leak current that may be caused by high heat treatment in a reflow process or the like may be reduced, and the capacity retentiveness before and after heat treatment may be increased.

According to the production method of the invention, the above-mentioned niobium solid electrolytic capacitor of the invention may be produced efficiently and in a simplified manner.

DESCRIPTION OF THE PREFERRED EMBODIMENTS

Embodiments of the invention are described in more detail hereinunder, to which, however, the invention should not be limited. Neither overstepping nor changing the spirit and the scope thereof, the invention may be changed and modified in any desired manner.

Figure 1:
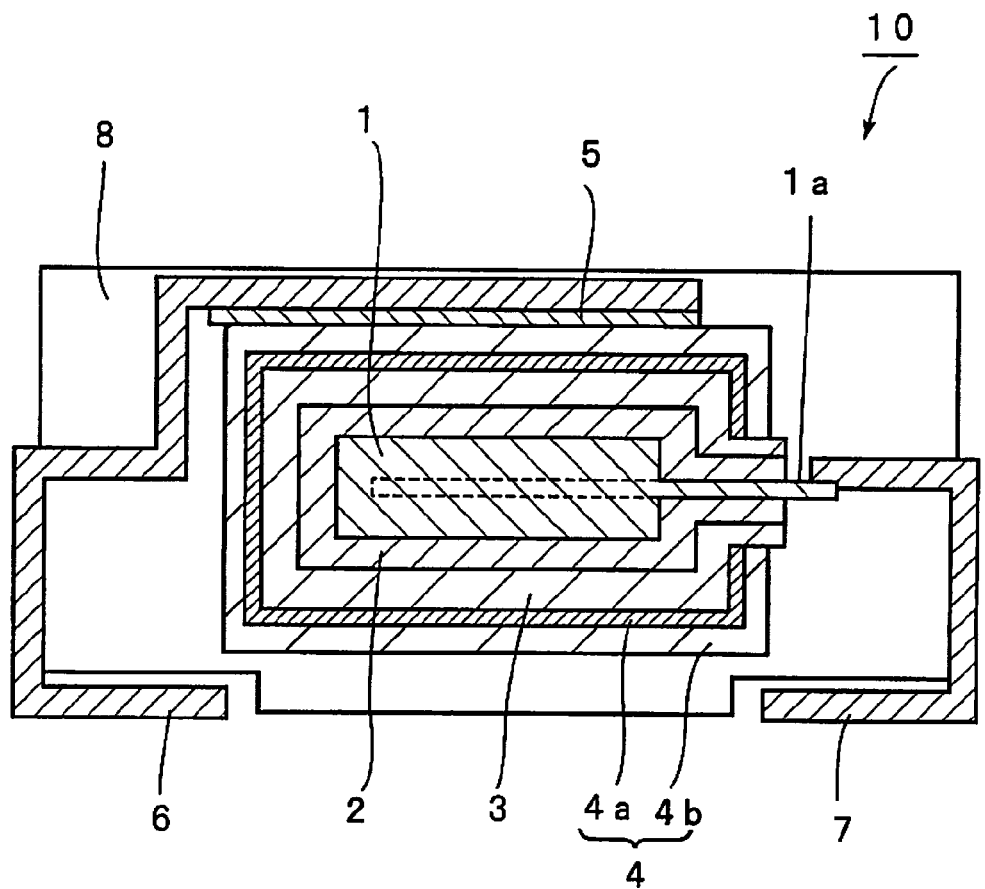
FIG. 1 is a schematic cross-sectional view of one embodiment of the solid electrolytic capacitor of the invention.

FIG. 1 is a schematic cross-sectional view of one embodiment of the solid electrolytic capacitor of the invention. As in FIG. 1, the niobium solid electrolytic capacitor 10 comprises a dielectric layer 2, a conductive polymer layer 3, a carbon layer 4a and a silver paste layer 4b, as formed in that order on the surface of an anode 1. The anode 1 is formed of a sintered porous body.

The carbon layer 4a and the silver paste layer 4b form a cathode 4. The silver paste layer 4b is connected to a cathode terminal 6 via a conductive adhesive layer 5 therebetween. An anode lead 1a is connected with the center part of the anode 1, and the anode lead 1a is connected to an anode terminal 7. A mold resin casing 8 is formed so as to lead the end of the anode terminal 7 and that of the cathode terminal 6 outside it.

The anode 1 is formed of a sintered porous body of oxide particles of niobium monoxide or niobium dioxide and niobium particles; and the dielectric layer 2 is formed on the surface of the sintered porous body, and this comprises, as the main ingredient thereof, highly-insulating niobium oxide ($Nb_2O_5$).

The conductive polymer layer 3 is formed of a conductive polymer such as polypyrrole, polythiophene. In this embodiment, the conductive polymer layer 3 serves as an electrolyte layer, to which, however, the invention should not be limited. The electrolyte layer may be formed of any other material such as manganese dioxide.

The carbon layer 4a is formed by applying a carbon paste to the structure; and the silver paste layer 4b is formed by applying thereto a silver paste containing silver particles and an organic solvent.

Examples and Comparative Examples are described below.

<Experiment 1>

EXAMPLE 1

Step 1:

First, a niobium powder of such that the product of the capacity of the sintered niobium body after electrolytic oxide film formation and the electrolytic voltage thereof, CV is 150,000 [μF·V/g], was mixed with a niobium monoxide powder. The blend ratio was such that the content of the niobium monoxide powder could be 20% by weight of the overall mass of the anode.

Unless otherwise specifically indicated in the following description, the CV value in Examples and Comparative Examples is 150,000 [μF·V/g]. The CV value in the invention is one measured according to the Standard of Electronic Industries Association of Japan, EIAJ RC-2361A. In the measurement, the test liquid was a 30 wt. % sulfuric acid solution; and the test frequency was 120 Hz. The overlapping of the bias voltage was omitted.

Step 2:

The mixture of niobium powder and niobium monoxide powder prepared in the step 1 was sintered at about 1200° C. to form an anode 1 of a sintered porous body. The anode 1 is formed of a sintered porous body with niobium particles and niobium monoxide particles fusing together.

The anode 1 was processed for anodic oxidation in an aqueous 0.1 wt. % ammonium fluoride solution kept at 60° C., at a constant voltage of 10 V for 10 hours. Accordingly, a dielectric layer 2 was formed on the surface of the anode 1.

The composition of the dielectric layer 2 thus formed in the manner as above was analyzed through XPS (X-ray photo-electronic spectrometry).

Figure 2:
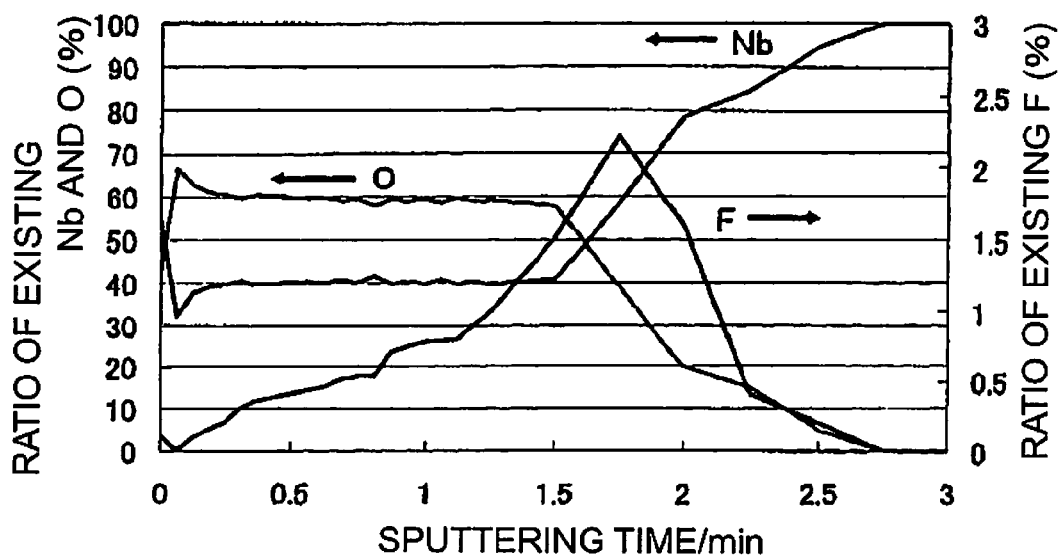
FIG. 2 is a graph showing the data of XPS analysis of the composition of the dielectric layer in Example 1 of the invention.

FIG. 2 is a graph showing the data of the dielectric layer analyzed through XPS. The horizontal axis indicates a sputtering time (min), corresponding to the thickness in the depth direction of the dielectric layer. The sputtering time of 0 minute indicates the surface of the dielectric layer, which is on the cathode side of the dielectric layer. With the sputtering time going on, the oxygen concentration in the dielectric layer decreases and the niobium concentration from the anode material increases, and the area around this corresponds to the anode side of the dielectric layer. The vertical axis on the left side indicates a ratio of existing Nb (niobium) and O (oxygen) (%); and the vertical axis on the right side indicates a ratio of existing F (fluorine) (%). The site at which the oxygen O concentration decreased to 20% on the anode side of the dielectric layer is referred to as an interface to the anode.

As in FIG. 2, oxygen (O) exists in the dielectric layer, and the main ingredients of the dielectric layer are Nb and O.

F (fluorine) also exists in the dielectric layer. As in FIG. 2, the F concentration distribution profile in the dielectric layer is such that the F concentration peak is on the anode side by more than a half of the thickness direction of the dielectric layer. In this, the thickness of the dielectric layer is from the surface of the dielectric layer (sputtering time, 0 minute) to the site at which the oxygen (O) concentration has reached 20%.

The F content of the dielectric layer is 0.24% by weight of the total of the anode and the dielectric layer. The F content was computed from the existing ratio of the element through XPS.

Step 3:

Next, a polypyrrole film was formed by chemical polymerization on the surface of the dielectric layer 2. With the thus-formed polypyrrole film made to serve as an anode, next a polypyrrole film was formed by electrolytic polymerization, thereby giving a conductive polymer layer 3. A carbon paste and a silver paste were applied successively onto the conductive polymer layer 3, thereby forming a carbon layer 4a and a silver paste layer 4b, and a solid electrolytic capacitor A1 was thus produced in the manner as above.

EXAMPLE 2

In the step 2 in Example 1, the anodic oxidation with an aqueous ammonium fluoride solution was followed by additional anodic oxidation with an aqueous 0.1 wt. % phosphoric acid solution at 40° C. for 2 hours to form a dielectric layer. The composition of the formed dielectric layer was analyzed through XPS.

Figure 3:
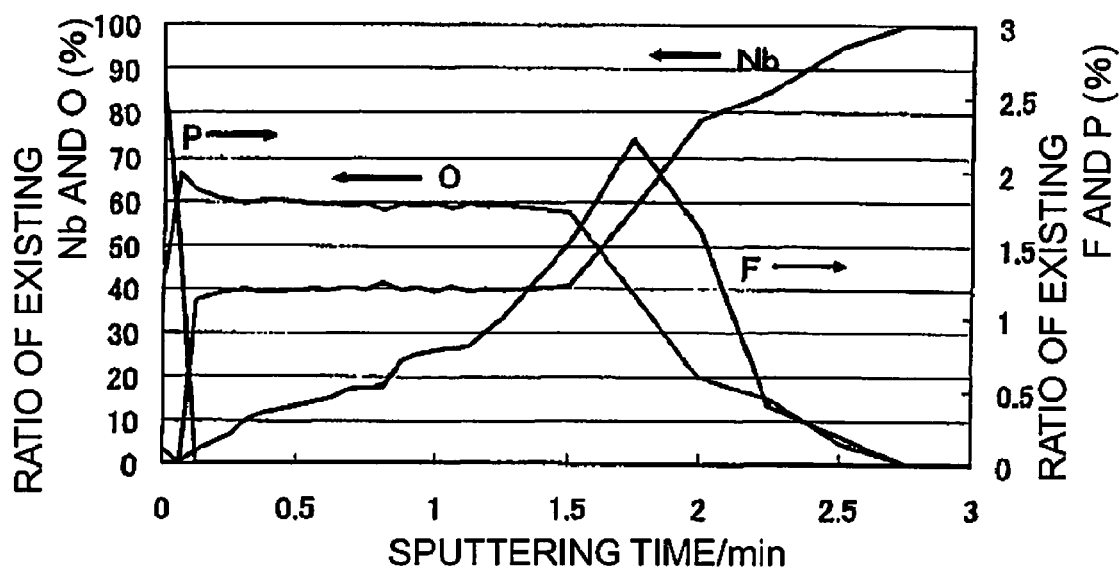
FIG. 3 is a graph showing the data of XPS analysis of the composition of the dielectric layer in Example 2 of the invention.

FIG. 3 is a graph showing the data of XPS analysis of the composition of the dielectric layer.

In FIG. 3, the horizontal axis indicates a sputtering time (min), corresponding to the thickness in the depth direction of the dielectric layer. The vertical axis on the left side indicates a ratio of existing Nb and O (%); and the vertical axis on the right side indicates a ratio of existing F and P (%).

As in FIG. 3, phosphorus (P) exists in the surface and around it of the dielectric layer. P is shifted on the cathode side. When the range in which the O (oxygen) concentration reaches 10% of the peak thereof is defined as the thickness of the dielectric layer, then P is shifted on the cathode side in such a manner that at least 90% of all P may exist within a range of 1/10 of the thickness of the dielectric layer.

The F content is 0.24% by weight of the total of the anode and the dielectric layer; and the P content is 0.03% by weight of the total of the anode and the dielectric layer. The P content was computed from the existing ratio of the element through XPS.

Next, in the same manner as in Example 1, a solid electrolytic capacitor A2 was produced.

COMPARATIVE EXAMPLE 1

In the step 2 in Example 1, an aqueous 0.1 wt. % nitric acid solution was used in anodic oxidation, in place of ammonium fluoride. The others were the same as in Example 1, and a solid electrolytic capacitor X was produced.

COMPARATIVE EXAMPLE 2

In the step 1 in Example 1, an anode was formed of a niobium powder alone, not mixing the niobium powder with niobium monoxide. The others were the same as in Example 1, and a solid electrolytic capacitor Y was produced.

COMPARATIVE EXAMPLE 3

In Example 2, an anode was formed of a niobium powder alone, not mixing the niobium powder with a niobium monoxide powder. The others were the same as in Example 2, and a solid electrolytic capacitor Z was produced.

COMPARATIVE EXAMPLE 4

An anode was formed of a niobium powder alone, not mixing the niobium powder with a niobium monoxide powder, and the anode was processed for anodic oxidation in an aqueous 0.1 wt. % nitric acid solution as in Comparative Example 1. The others were the same as in Example 1, and a solid electrolytic capacitor W was produced.

[Evaluation of Capacitor]

The solid electrolytic capacitors A1, A2, X, Y, Z and W produced in the above were analyzed for leak current. The leak current was detected as follows: The capacitor was heated at 250° C. for 10 minutes, then a voltage of 5 V was applied to it, and after 20 seconds, the current was measured. In addition, the capacitance ratio before and after heat treatment at 105° C. for 2000 hours was determined, and this is the capacity retentiveness. Concretely, the capacity retentiveness was obtained according to the following formula:

Capacity Retentiveness (%)=(capacitance after heat treatment/capacitance before heat treatment)× 100.

The test data are shown in Table 1. The leak current value is represented by an index based on the leak current value of the capacitor A1, 100.

TABLE 1

|  | Leak Current | Capacity Retentiveness (%) |
| --- | --- | --- |
| Solid Electrolytic Capacitor A1 | 100 | 92 |
| Solid Electrolytic Capacitor A2 | 70 | 95 |
| Solid Electrolytic Capacitor X | 500 | 82 |
| Solid Electrolytic Capacitor Y | 200 | 60 |
| Solid Electrolytic Capacitor Z | 150 | 60 |
| Solid Electrolytic Capacitor W | 500 | 58 |

As in Table 1, it is understood that the capacitors A1 and A2 of the invention noticeably reduced the leak current as compared with the comparative capacitors X, Y, Z and W, and can improve the capacity retentiveness. Comparing the capacitor A1 with the capacitor A2 confirms that, when the dielectric layer additionally contains phosphorus, then the capacitor may more effectively inhibit leak current and improve the capacity retentiveness.

Comparing the capacitor X with the capacitor W confirms that the anode containing niobium monoxide or niobium dioxide could mainly improve the capacity retentiveness but could not almost reduce leak current. Comparing the capacitors Y and Z with the capacitor W confirms that the dielectric layer containing fluorine could mainly reduce leak current but could not almost improve the capacity retentiveness.

However, when niobium monoxide or niobium dioxide was added to the anode and fluorine was added to the dielectric layer according to the invention, then the leak current was noticeably reduced and the capacity retentiveness was noticeably improved, as compared with the case where niobium monoxide or niobium dioxide was merely added to the anode or the case where fluorine was merely added to the dielectric layer; and the invention has thus attained the synergistic effect.

<Experiment 2>

This is to demonstrate the influence of the niobium monoxide content of anode on leak current and capacity retentiveness.

EXAMPLE 3

A solid electrolytic capacitor A3 was produced in the same manner as in Example 1, for which, however, the blend ratio of the niobium monoxide powder in the mixture of niobium powder and niobium monoxide powder was changed to 5% by weight.

EXAMPLE 4

A solid electrolytic capacitor A4 was produced in the same manner as in Example 1, for which, however, the blend ratio of the niobium monoxide powder in the mixture of niobium powder and niobium monoxide powder was changed to 50% by weight.

[Evaluation of Capacitor]

The solid electrolytic capacitors A3 and A4 produced in the above were analyzed for leak current and capacity retentiveness in the same manner as in Experiment 1. The test data are shown in Table 2. In Table 2, the data of the solid electrolytic capacitors Y and A1 are additionally shown. The leak current value is represented by an index based on the leak current value of the capacitor A1, 100.

TABLE 2

|  | Niobium Monoxide Content (% by Weight) | Leak Current | Capacity Retentiveness (%) |
| --- | --- | --- | --- |
| Solid Electrolytic Capacitor Y | 0 | 200 | 60 |
| Solid Electrolytic Capacitor A3 | 5 | 130 | 90 |
| Solid Electrolytic Capacitor A1 | 20 | 100 | 95 |
| Solid Electrolytic Capacitor A4 | 50 | 120 | 90 |

As is obvious from the data in Table 2, it is understood that, when the niobium monoxide content is defined to fall within a range of from 5 to 50% by weight of the overall amount of the anode, then the leak current may be noticeably reduced and the capacity retentiveness may be noticeably improved.

EXAMPLE 5

A solid electrolytic capacitor A5 was produced in the same manner as in Example 2, for which, however, the blend ratio of the niobium monoxide powder in the mixture of niobium powder and niobium monoxide powder was changed to 5% by weight.

EXAMPLE 6

A solid electrolytic capacitor A6 was produced in the same manner as in Example 2, for which, however, the blend ratio of the niobium monoxide powder in the mixture of niobium powder and niobium monoxide powder was changed to 50% by weight.

[Evaluation of Capacitor]

The solid electrolytic capacitors A5 and A6 produced in the above were analyzed for leak current and capacity retentiveness in the same manner as in Experiment 1. The test data are shown in Table 3. In Table 3, the data of the solid electrolytic capacitors Z and A2 are additionally shown. The leak current value is represented by an index based on the leak current value of the capacitor A1, 100.

TABLE 3

|  | Niobium Monoxide Content (% by Weight) | Leak Current | Capacity Retentiveness (%) |
|---|---|---|---|
| Solid Electrolytic Capacitor Z | 0 | 150 | 60 |
| Solid Electrolytic Capacitor A5 | 5 | 110 | 92 |
| Solid Electrolytic Capacitor A2 | 20 | 70 | 98 |
| Solid Electrolytic Capacitor A6 | 50 | 100 | 92 |

As is obvious from the data in Table 3, it is understood that, when the niobium monoxide content is defined to fall within a range of from 5 to 50% by weight of the overall amount of the anode, then the leak current may be noticeably reduced and the capacity retentiveness may be noticeably improved.

<Experiment 3>

This is to demonstrate the influence of the product of the capacity and the electrolytic voltage of the sintered niobium body after electrolytic oxide film formation, CV, on leak current and capacity retentiveness.

EXAMPLE 7

A niobium powder having CV of 100,000 [μF·V/g] and a niobium monoxide powder were mixed in such a manner that the niobium monoxide powder content could be 20% by weight.

The mixed powder was sintered at about 1200° C. to form an anode of a sintered porous body. The anode was oxidized in an aqueous 0.1 wt. % ammonium fluoride solution kept at 60° C., at a constant voltage of 6.7 V for 10 hours, thereby forming a dielectric layer. The others were the same as in Example 1, and a solid electrolytic capacitor A7 was thus produced.

EXAMPLE 8

A niobium powder having CV of 80,000 [μF·V/g] and a niobium monoxide powder were mixed in such a manner that the niobium monoxide powder content could be 20% by weight.

The mixed powder was sintered at about 1200° C. to form an anode of a sintered porous body. The anode was oxidized in an aqueous 0.1 wt. % ammonium fluoride solution kept at 60° C., at a constant voltage of 5.3 V for 10 hours, thereby forming a dielectric layer. The others were the same as in Example 1, and a solid electrolytic capacitor A8 was thus produced.

[Evaluation of Capacitor]

The solid electrolytic capacitors produced in the above were analyzed for leak current and capacity retentiveness in the same manner as in Experiment 1. The test data are shown in Table 4. The leak current value is represented by an index based on the leak current value of the capacitor A1, 100. In Table 4, the data of the capacitor A1 are additionally shown.

TABLE 4

|  | CV Value (μF·V·g$^{-1}$) | Leak Current | Capacity Retentiveness (%) |
|---|---|---|---|
| Solid Electrolytic Capacitor A8 | 80,000 | 200 | 80 |
| Solid Electrolytic Capacitor A7 | 100,000 | 120 | 92 |
| Solid Electrolytic Capacitor A1 | 150,000 | 100 | 95 |

As is obvious from the data in Table 4, it is understood that, when the CV value is defined to be at least 100,000 [μF·V/g], then the leak current may be noticeably reduced and the capacity retentiveness may be noticeably improved.

EXAMPLE 9

A niobium powder having CV of 100,000 [μF·V/g] and a niobium monoxide powder were mixed in such a manner that the niobium monoxide powder content could be 20% by weight.

The mixed powder was sintered at about 1200° C. to form an anode of a sintered porous body. The anode was oxidized in an aqueous 0.1 wt. % ammonium fluoride solution kept at 60° C., at a constant voltage of 6.7 V for 10 hours, and then again processed for anodic oxidation for 2 hours in an aqueous 0.1 wt. % phosphoric acid solution kept at 40° C., thereby forming a dielectric layer. The others were the same as in Example 2, and a solid electrolytic capacitor A9 was thus produced.

EXAMPLE 10

A niobium powder having CV of 80,000 [μF·V/g] and a niobium monoxide powder were mixed in such a manner that the niobium monoxide powder content could be 20% by weight.

The mixed powder was sintered at about 1200° C. to form an anode of a sintered porous body. The anode was oxidized in an aqueous 0.1 wt. % ammonium fluoride solution kept at 60° C., at a constant voltage of 5.3 V for 10 hours, and then again processed for anodic oxidation for 2 hours in an aqueous 0.1 wt. % phosphoric acid solution kept at 40° C., thereby forming a dielectric layer. The others were the same as in Example 2, and a solid electrolytic capacitor A10 was thus produced.

[Evaluation of Capacitor]

The solid electrolytic capacitors produced in the above were analyzed for leak current and capacity retentiveness in the same manner as in Experiment 1. The test data are shown in Table 5. The leak current value is represented by an index based on the leak current value of the capacitor A2, 100. In Table 5, the data of the capacitor A2 are additionally shown.

TABLE 5

|  | CV Value (μF·V·g$^{-1}$) | Leak Current | Capacity Retentiveness (%) |
|---|---|---|---|
| Solid Electrolytic Capacitor A10 | 80,000 | 150 | 80 |
| Solid Electrolytic Capacitor A9 | 100,000 | 100 | 90 |
| Solid Electrolytic Capacitor A2 | 150,000 | 70 | 98 |

As is obvious from the data in Table 5, it is understood that, when the CV value is defined to be at least 100,000 [μF·V/g], then the leak current may be noticeably reduced and the capacity retentiveness may be noticeably improved.

<Experiment 4>

This is to demonstrate the influence of the nitrogen content of dielectric layer on leak current and capacity retentiveness.

EXAMPLE 11

A niobium powder and a niobium monoxide powder were mixed to prepare a mixed powder having a niobium monoxide powder content of 20% by weight. The mixed powder was nitrided at 400° C. for 10 seconds. The nitridation atmosphere was 100% nitrogen. After the nitridation, the niobium mixed powder was analyzed for the nitrogen content thereof, according to the thermal conductivity method of JIS G1228, and as a result, the nitrogen content of the powder was 0.01% by weight.

In the same manner as in Example 1 but using the nitrided powder in producing the anode, a solid electrolytic capacitor A11 was produced.

EXAMPLE 12

A solid electrolytic capacitor A12 was produced in the same manner as in Example 11, for which, however, the nitridation time was 20 minutes and the nitrogen content of the mixed powder was 1% by weight.

EXAMPLE 13

A solid electrolytic capacitor A13 was produced in the same manner as in Example 11, for which, however, the nitridation time was 60 minutes and the nitrogen content of the mixed powder was 3% by weight.

[Evaluation of Capacitor]

The solid electrolytic capacitors produced in the above were analyzed for leak current and capacity retentiveness, in the same manner as in Experiment 1.

The test data are shown in Table 6. The leak current value is represented by an index based on the leak current value of the capacitor A1, 100. In Table 6, the data of the capacitor A1 are additionally shown.

TABLE 6

|  | Nitrogen Content (% by Weight) | Leak Current | Capacity Retentiveness (%) |
| --- | --- | --- | --- |
| Solid Electrolytic Capacitor A1 | 0.00 | 100 | 95 |
| Solid Electrolytic Capacitor A11 | 0.01 | 80 | 95 |
| Solid Electrolytic Capacitor A12 | 1.00 | 70 | 95 |
| Solid Electrolytic Capacitor A13 | 3.00 | 50 | 95 |

As is obvious from the data in Table 6, it is understood that, when the nitrogen content is defined to fall within a range of from 0.01 to 3% by weight of the total of the anode and the dielectric layer, then the leak current may be noticeably reduced and the capacity retentiveness may be noticeably improved.

EXAMPLE 14

A niobium powder and a niobium monoxide powder were mixed to prepare a mixed powder having a niobium monoxide powder content of 20% by weight. The mixed powder was nitrided at 400° C. for 10 seconds. The nitridation atmosphere was 100% nitrogen. After the nitridation, the niobium mixed powder was analyzed for the nitrogen content thereof, according to the thermal conductivity method of JIS G1228, and as a result, the nitrogen content of the powder was 0.01% by weight.

In the same manner as in Example 2 but using the nitrided powder in producing the anode, a solid electrolytic capacitor A14 was produced.

EXAMPLE 15

A solid electrolytic capacitor A15 was produced in the same manner as in Example 14, for which, however, the nitridation time was 20 minutes and the nitrogen content of the mixed powder was 1% by weight.

EXAMPLE 16

A solid electrolytic capacitor A16 was produced in the same manner as in Example 14, for which, however, the nitridation time was 60 minutes and the nitrogen content of the mixed powder was 3% by weight.

[Evaluation of Capacitor]

The solid electrolytic capacitors produced in the above were analyzed for leak current and capacity retentiveness, in the same manner as in Experiment 1.

The test data are shown in Table 7. The leak current value is represented by an index based on the leak current value of the capacitor A1, 100. In Table 7, the data of the capacitor A2 are additionally shown.

TABLE 7

|  | Nitrogen Content (% by Weight) | Leak Current | Capacity Retentiveness (%) |
| --- | --- | --- | --- |
| Solid Electrolytic Capacitor A2 | 0.00 | 70 | 95 |
| Solid Electrolytic Capacitor A14 | 0.01 | 50 | 95 |
| Solid Electrolytic Capacitor A15 | 1.00 | 40 | 95 |
| Solid Electrolytic Capacitor A16 | 3.00 | 30 | 95 |

As is obvious from the data in Table 7, it is understood that, when the nitrogen content is defined to fall within a range of from 0.01 to 3% by weight of the total of the anode and the dielectric layer, then the leak current may be noticeably reduced and the capacity retentiveness may be noticeably improved.

In the above Examples, a niobium monoxide powder was used as the niobium oxide powder to be mixed with a niobium or niobium alloy powder; however, when a niobium dioxide powder is used in place of the niobium monoxide powder, then the same effect as above can be obtained.

What is claimed is:

1. A niobium solid electrolytic capacitor comprising an anode formed of a sintered porous body of oxide particles of niobium monoxide or niobium dioxide and metal particles of niobium or a niobium alloy, a dielectric layer formed on the surface of said sintered porous body of said oxide particles and said metal particles, and a cathode formed on the dielectric layer, wherein the dielectric layer contains fluorine.

2. The niobium solid electrolytic capacitor as claimed in claim 1, wherein the peak of the fluorine concentration distribution in the dielectric layer exists in the interface adjacent to the anode or in less than a half in the thickness direction of the dielectric layer on the anode side.

3. The niobium solid electrolytic capacitor as claimed in claim 1, wherein the dielectric layer additionally contains phosphorus.

4. The niobium solid electrolytic capacitor as claimed in claim 3, wherein phosphorus is shifted on the cathode side.

5. A method for producing the niobium solid electrolytic capacitor of claim 3, which comprises a step of anodic oxidation of an anode containing an oxide of niobium monoxide or niobium dioxide and a metal of niobium or a niobium alloy, in an aqueous solution containing a fluoride ion, followed by additional anodic oxidation thereof in an aqueous phosphoric acid solution.

6. The niobium solid electrolytic capacitor as claimed in claim 1, wherein the dielectric layer additionally contains nitrogen.

7. The niobium solid electrolytic capacitor as claimed in claim 6, wherein the nitrogen content is preferably within a range of from 0.01 to 3% by weight of the total of the anode and the dielectric layer.

8. The niobium solid electrolytic capacitor as claimed in claim 1, wherein the content of niobium monoxide and niobium dioxide is within a range of from 5 to 50% by weight of the overall amount of the anode.

9. The niobium solid electrolytic capacitor as claimed in claim 1, wherein a niobium powder or niobium alloy powder having a product of the capacity and the electrolytic voltage, CV of at least 100,000 per gram [μF·V/g] is used.

10. A method for producing the niobium solid electrolytic capacitor of claim 1, which comprises a step of anodic oxidation of an anode containing an oxide of niobium monoxide or niobium dioxide and a metal of niobium or a niobium alloy, in an aqueous solution containing a fluoride ion.

11. The method as claimed in claim 10, wherein the dielectric layer additionally contains nitrogen, and which comprises a step of nitriding oxide particles of niobium monoxide or niobium dioxide and metal particles of niobium or a niobium alloy, and then sintering it to form a nitrogen-containing anode, or comprises a step of sintering oxide particles of niobium monoxide or niobium dioxide and metal particles of niobium or a niobium alloy, and then nitriding it to form a nitrogen-containing anode.

* * * * *